INVENTOR.
TSUNG-HSIEN CHENG
BY Elmer W. Galbraith
ATTORNEY

Sept. 6, 1966 TSUNG-HSIEN CHENG 3,271,658

THIN FILM SUPERCONDUCTING TRANSFORMER

Filed May 25, 1962

4 Sheets-Sheet 3

3,271,658

THIN FILM SUPERCONDUCTING TRANSFORMER

Tsung-Hsien Cheng, Croton-on-Hudson, N.Y., assignor to International Business Machines Corporation, New York, N.Y., a corporation of New York Filed May 25, 1962, Ser. No. 197,718
6 Claims. (Cl. 323—44)

This invention relates to electrical circuitry and more particularly to electrical circuitry operable at very low temperatures.

It is known that a thin film transformer with a one-to-one turns ratio can be obtained by depositing a first thin film conductor over a second thin film conductor, said conductors being electrically insulated from each other. Thin film cryogenic circuitry is generally deposited over a superconducting shield in order to reduce the inductance of the circuitry. However, if a thin film transformer is deposited over a superconductive shield the transformer is very ineffective. Since the part of the circuitry which forms the transformer can not have a shield and since the other portions of the circuitry must be shielded, thin film cryogenic transformers are usually made by depositing the two conductors which form the transformer over a hole in the superconducting shield. A thin film cryogenic transformer is shown in copending U.S. patent application Serial No. 132,961, entitled "Transformer," by R. L. Garwin, filed on August 21, 1961, now U.S. Patent 3,184,674, which is assigned to the assignee of the present invention.

In large scale electronic systems, the physical size of the circuitry is extremely important. The present invention provides a novel thin film cryogenic composite transformer which has a turns ratio greater than one-to-one and which occupies a very small physical area. Certain parts of the composite transformer of the present invention require a superconducting shield; however, these parts are conveniently grouped along two sides of the transformer.

According to another feature of the present invention, the entire transformer can be deposited over a superconducting shield. This is particularly advantageous when the entire circuit is deposited on a metal substrate which acts as the shield since cutting a hole in a metal substrate and depositing conductors over the hole is very difficult. With the present invention when the entire composite transformer is deposited over a metal substrate (with no hole therein), a segment of material which can be changed from the superconductive state to the resistive state (i.e., a switching element) is placed between the conductors which form the transformer and the superconducting shield. The switching element is biased near its switching point and the application of a current signal to the primary of the transformer causes the material to change from the superconductive state to the resistive state. As the switching element changes state, the inductance of the secondary of the transformer is changed thereby inducing a voltage in the secondary.

An object of the present invention is to provide an improved thin film transformer.

Another object of the present invention is to provide a thin film transformer which occupies a relatively small surface area.

A still further object of the present invention is to provide a thin film transformer which has a turns ratio greater than one-to-one and which occupies a relatively small surface area.

Yet another object of the present invention is to provide an efficient layout for a transformer which has a turns ratio greater than one-to-one.

Still another object of the present invention is to provide a transformer with a turns ratio greater than one-to-one and wherein those conductors which need a superconducting ground plane to reduce inductance are conveniently grouped.

A still further object of the present invention is to provide a transformer which can be entirely deposited over a superconducting ground plane.

Yet another object of the present invention is to provide a layout for a thin film transformer which has a turns ratio greater than one-to-one and wherein the primary and secondary circuits have relatively small self inductances.

The foregoing and other objects, features and advantages of the invention will be apparent from the following more particular description of preferred embodiments of the invention, as illustrated in the accompanying drawings.

Figure 1:
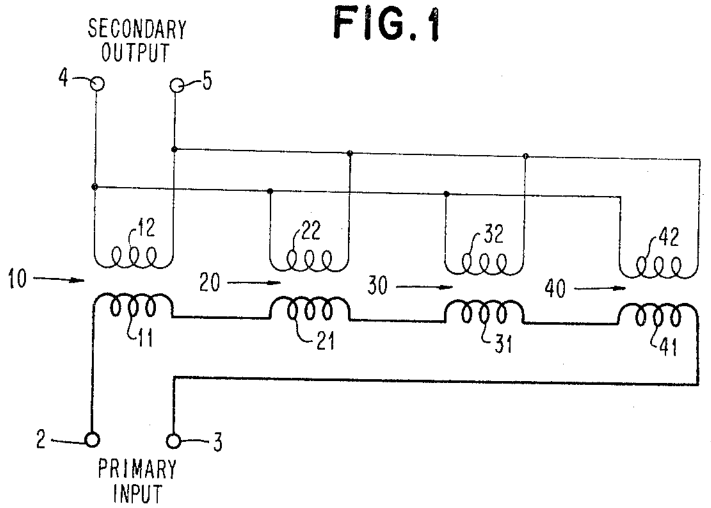
FIGURE 1 is a schematic circuit diagram of a transformer with a turns ratio of four-to-one.

FIGURE 1 shows a schematic circuit diagram of a composite transformer which has a turns ratio of four-to-one. It includes four individual transformers 10, 20, 30 and 40, each of which has a primary respectively 11, 21, 31 and 41 and a secondary respectively 12, 22, 32 and 42. The primaries 11, 21, 31 and 41 are connected in series between the input of the primary 2 and 3 and the secondaries 12, 22, 32 and 42 are connected in parallel across the output of the secondary 4 and 5. A four volt alternating current signal applied between primary input 2 and 3 will produce a one volt alternating signal between the output of the secondary 4 and 5. Such transformers are well known.

The present invention is concerned with the fabrication of a composite transformer with a turns ratio greater than one-to-one in thin film form. A transformer with a one-to-one turns ratio can be fabricated in thin film form by depositing a primary conductor on the top of an insulated secondary conductor. Hence, in thin film form, the four individual transformers shown in FIGURE 1 would merely consist of four pairs of conductors, each pair of conductors having two conductors one positioned above the other.

Figure 2:
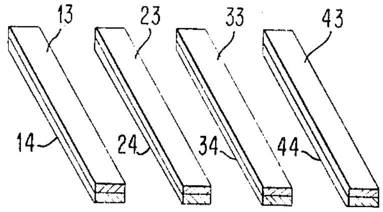
FIGURE 2 shows four thin film transformers.

FIGURE 2 shows four thin film primary conductors 13, 23, 33 and 43 and four thin film secondary conductors 14, 24, 34 and 44. Each primary conductor is positioned over the associated secondary conductor thereby forming four individual transformers. In order to obtain a four-to-one transformer such as that shown schematically in FIGURE 1, the four primary conductors 13, 23, 33 and 43 must be connected in series and the four secondary conductors 14, 24, 34 and 44 must be connected in parallel. For clarity of illustration, the insulator between each pair of conductors is not shown.

As previously stated in order to reduce the inductance of thin film superconductive circuitry, a superconducting shield is placed between the circuitry and the substrate which supports the circuitry (or the circuitry is deposited on a metal substrate which acts as a shield). However, if coupling by transformer action is desired between two thin film conductors one of which is positioned above the other, no shield is placed beneath the conductors. The previously-referenced copending application shows a hole in the superconducting shield at the point where the coupling between the primary and the secondary conductors is desired. Where the shield is removed, if the secondary conductor is short circuited, the algebraic sum of the current in the primary and the current in the secondary is zero. In a composite transformer, which includes a plurality of one-to-one transformers, the only place where the superconducting shield can be eliminated without unduly increasing the inductance of the circuitry is where a plurality of layers of circuitry are positioned above each other and the algebraic sum of the currents in the various conductors would be zero if the secondary were short circuited. For example, where three conductors are positioned above each other, if, when the secondary of the transformer is short circuited, the top conductor has two units of current flowing in one direction and the other two conductors each have one unit of current flowing in the opposite direction, no superconductive shield is needed. The current which would flow in the various conductors if the secondary were short circuited is called the short-circuit current.

Figure 3A:
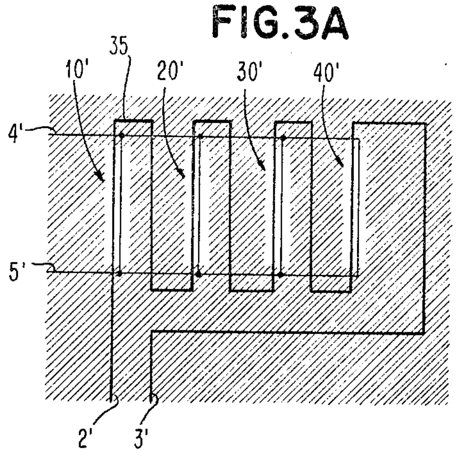
FIGURES 3A and 3B show inefficient layouts for a thin film transformer which has a turns ratio of four-to-one.
Figure 3B:
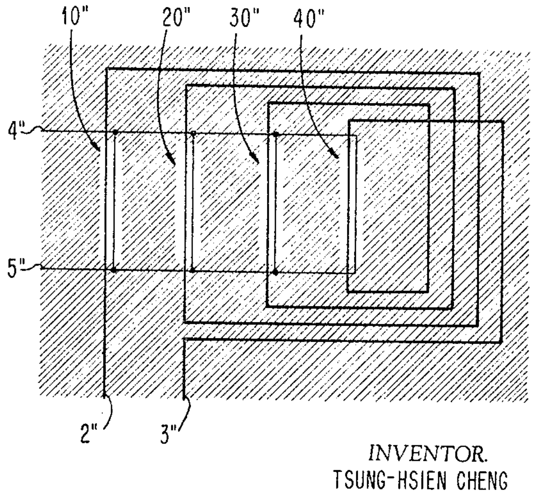

Two straight forward ways in which the four transformers shown in FIGURE 2 can be interconnected are shown in FIGURES 3A and 3B by single line diagrams. As in FIGURE 1, bold lines are used to indicate the circuitry which interconnects the primaries and light lines are used to indicate the circuitry which interconnects the secondaries. In FIGURES 3A and 3B, the shaded area represents the area where a superconductive shield is positioned beneath the circuitry. The components in FIGURE 3A which correspond to the components shown in FIGURE 1 are designated with the same numerals followed by a prime notation and the corresponding components of FIGURE 3B are designated with the same numerals followed by a double prime notation. The configurations shown in FIGURES 3A and 3B are operable; however, these configurations do not provide the maximum utilization of the substrate area. Furthermore, with the circuit layouts shown in FIGURES 3A and 3B, a superconducting shield is needed below all of the interconnecting circuitry. Even at points such as that designated by the numeral 35 in FIGURE 3A where the primary conductor can conveniently be positioned above the secondary conductor, the algebraic sum of the currents in the two layers is not zero when the secondary is short circuited. Hence, a superconductive shield is needed even if the primary is positioned over the secondary.

The novel layout of the present invention provides a device wherein no superconductive shield is needed below half of the interconnecting circuitry. The reason for this is that the interconnecting circuitry in the transformer of the present invention is arranged so that the algebraic sum of the short-circuit current in the interconnecting circuitry is zero over half of the interconnecting circuitry. Furthermore, the interconnecting circuitry which does require superconducting shield is conveniently grouped. It should also be noted that transformer action takes place in the interconnecting circuitry which is not shielded thereby increasing the coupling between the primary and the secondary.

Figure 4:
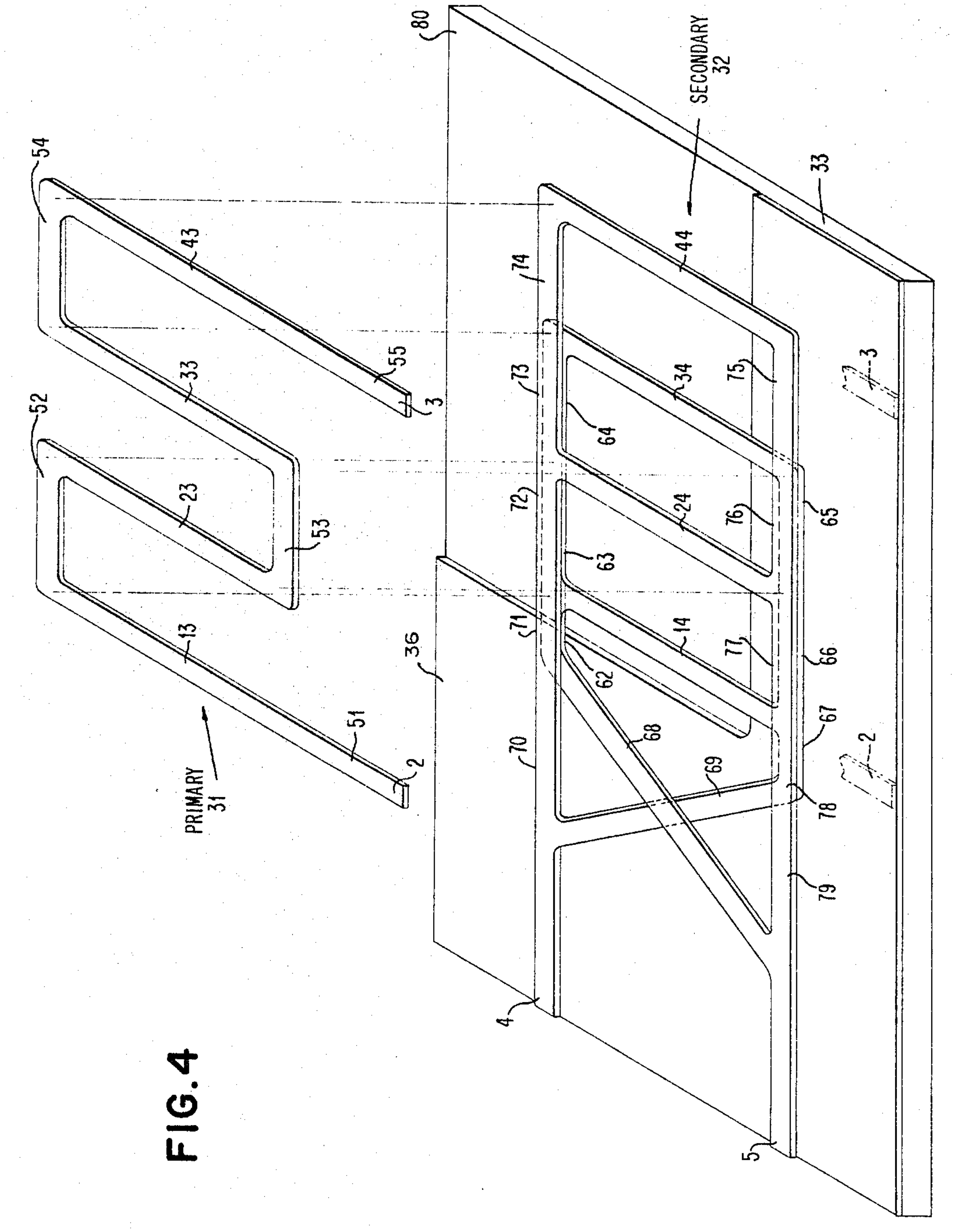
FIGURE 4 is an exploded perspective view of the transformer of the present invention.

The composite transformer of the present invention is shown in exploded perspective form in FIGURE 4. The transformer includes a composite primary 31 and a composite secondary 32. For clarity of illustration, the composite primary 31 is shown a substantial distance from the composite secondary 32. However, in the actual device the various conductors in primary 31 are deposited directly above the various conductors in secondary 32 after the conductors in the secondary 32 are covered with a layer of insulating material. The entire transformer is mounted on a substrate 33. However, certain portions of the circuitry are separated from substrate 33 by superconducting ground plane 36.

For clarity of illustration no insulating material is shown between the layers; however, it will be understood by those skilled in the art that the circuitry is separated from the superconducting shield 34 and each layer of circuitry is separated from adjacent layers by appropriate insulating material. The primary 31, the secondary 32 and the shield 36 can be made of a hard superconductive material such as lead by known fabrication techniques not discussed herein. The substrate 33 is made of a nonconductor such as glass or quartz.

The composite primary 31 includes the four primary conductors 13, 23, 33 and 43 shown in FIGURE 2 and the composite secondary 32 includes the four secondary conductors 14, 24, 34, and 44 shown in FIGURE 2. Five interconnecting segments 51 to 55 connect the primary conductors 13, 23, 33 and 43 in series between the primary input conductors 2 and 3. The composite secondary 32 is divided into two parts. The first part which includes conductors 62 to 67 connects secondary conductors 14 and 34 in parallel and the second part which includes conductors 71 to 78 connects secondary conductors 24 and 44 in parallel. The secondary conductors 14 and 34 are connected in parallel between secondary output conductors 4 and 5 by conductor segments 68 and 69, and secondary conductors 24 and 44 are connected in parallel between secondary output conductors 4 and 5 by conductor segments 70 to 79.

Except for the cross-over connections 68 and 69, all of the interconnecting circuitry in the first part of secondary 32 is positioned directly beneath the interconnecting circuitry of the second part of secondary 32. Superconducting shield 36 covers all of the substrate 33 except the area designated 80. Conductor segments 62 to 64 and 71 to 74 do not have any portion of superconducting shield 36 between them and the substrate 33 and all the circuitry which does have a portion of superconducting shield 36 between it and substrate 33 is conveniently grouped along two sides of the transformer.

Figure 5:
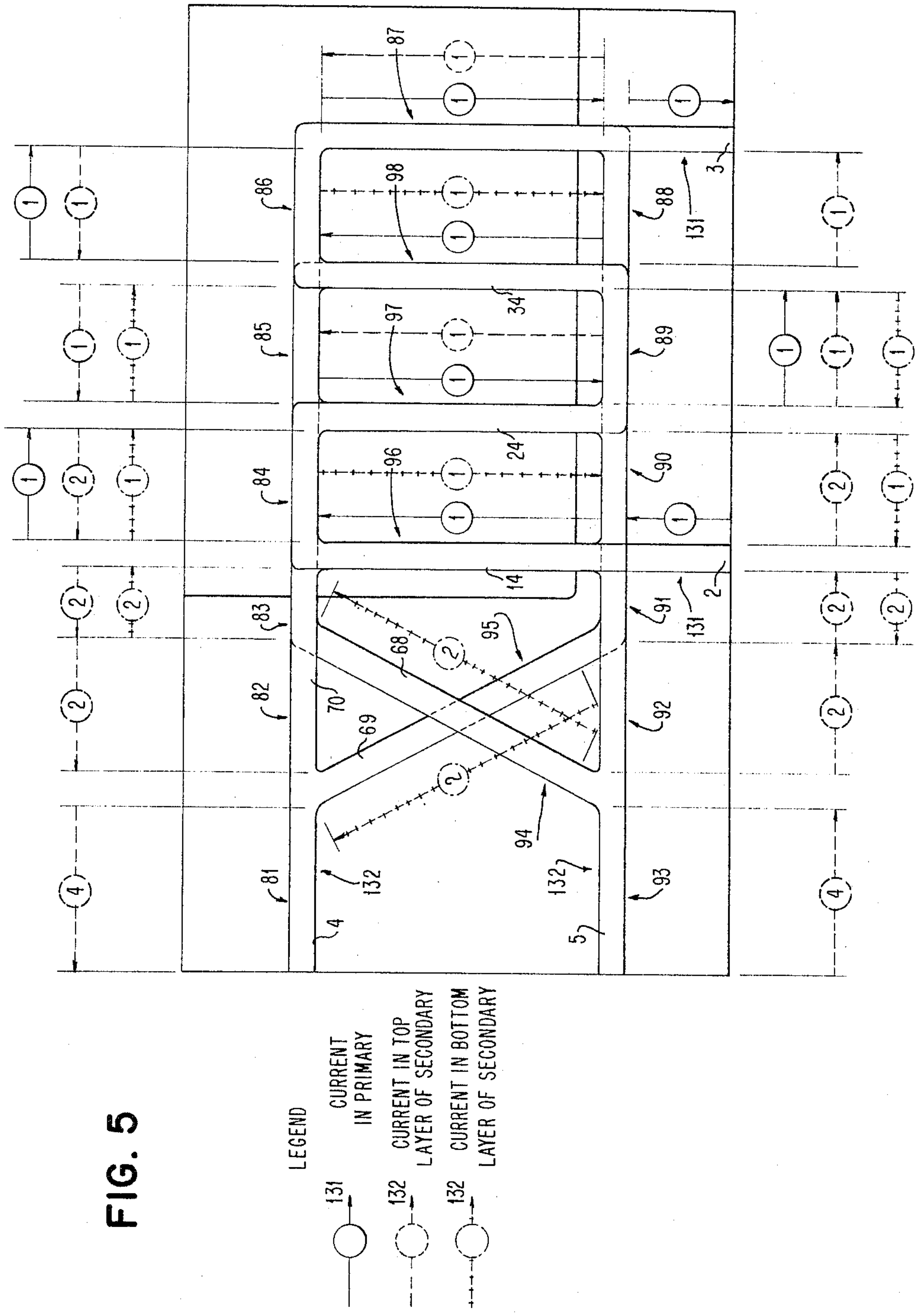
FIGURE 5 is a top view of the transformer of the present invention which is used to show the magnitude of the currents in each part of the transformer.

The reason that no superconductive shield is needed between conductor segments 62 to 64 and 71 to 74 will now be explained. FIGURE 5 shows the magnitude and the direction of the short-circuit current in each conductor in the transformer. Three different types of arrows are used to indicate the current in the three different layers of circuitry. As shown by the legend, a solid line arrow is used to indicate the direction of the current in each segment of the primary, a first type of broken arrow is used to indicate the direction of the current in each segment of the top layer of the secondary 32 and a second type of broken arrow is used to indicate the direction of the current in each segment of the bottom layer of secondary 32. The magnitude of the current in each segment of each conductor is indicated in an expanded part of each arrow. For convenience in reference between the specifications and the drawings, as shown in FIGURE 5, the transformer is divided into eighteen sections respectively designated 81 to 98. In each section 81 to 98 there is an indication of the magnitude of the current in each conductor in each layer of circuitry in the sections. It should be noted that the eighteen sections 81 to 98 are taken so that no section includes a junction of two conductors.

The current in the primary winding 31 flows in opposite directions in each of the sections 96, 97, 98 and 87. That is, the current in the primary flows in one direction in sections 96 and 98 and the opposite direction in sections 97 and 87. In each of the sections 96, 97, 98 and 87, the current in the primary induces a current in the associated section of the secondary. The direction of the current in each section of the secondary is opposite to the direction of the current in the associated section of the primary. Hence, the current in the secondary conductors in sections 96 and 98 flows in one direction and the current in the secondary conductors in sections 97 and 87 flows in the opposite direction.

In order to see which circuitry needs to be shielded, it is convenient to examine the conditions which would exist if the secondary is short circuited, hence, in the following discussion, it will be assumed that the secondary conductors 4 and 5 are short circuited and that one unit of current is applied between input terminals 2 and 3. Since the composite transformer has a turns ratio of four-to-one, and, since the secondary conductors 4 and 5 are short circuited, the one unit of current applied between primary input conductors 2 and 3 will produce four units of current in secondary output conductors 4 and 5. Stated differently, when one unit of current is flowing in the primary 31 and the secondary output conductors 4 and 5 are short circuited, one unit of current will be induced in each of the secondary conductors 14, 24, 34 and 44. These four units of curent will combine to produce four units of current in output conductors 4 and 5. The magnitude of the current in each conductor in each of the sections 81 to 98 (when one unit of current is applied to the primary 31 and when secondary conductors 4 and 5 are short circuited) can be seen by examining each layer of circuitry separately.

All of the segments of the primary conductor 31 are connected in series, hence (in each section where it is located) the primary 31 carries one unit of current. In the topmost layer of the secondary 32, one unit of current is induced in conductor 24 and one unit of current is induced in conductor 44. These two currents combine between sections 84 and 85 and between sections 89 and 90; hence, in sections 85, 86, 87 and 89, the top layer of secondary 32 carries one unit of current and in sections 82, 83, 84, 90, 91 and 92, the top layer of secondary 32 carries two units of current. In the bottom layer of the secondary 32, one unit of current is induced in conductor 14 and one unit of current is induced in conductor 34. These two currents combine between sections 83 and 84 and between sections 90 and 91; hence, in sections 84, 85, 89 and 90, the bottom layer of secondary 32 carries one unit of current and in sections 94, 95, 83 and 91, the bottom layer of secondary 32 carries two units of current. Between sections 81 and 82 and between sections 92 and 93, the two units of current in the bottom layer of the secondary and the two units of current of the top layer of the secondary combine to make a total of four units of current in sections 81 and 93.

It can easily be seen by algebraically summing the currents in the various conductors in sections 83, 84, 85 and 86, that the algebraic sum of the currents in each of these sections is zero; hence, no superconducting shield is needed beneath the interconnecting circuitry in these sections. In sections 81, 82 and 88 to 95, the algebraic sum of the currents is not zero; hence, a superconducting shielding is needed. It should be particularly noted that those sections of the circuitry which do require a superconducting shield are conveniently located along two sides of the transformer thereby making the transformer extremely easy to fabricate.

It should be understood that the magnitude of the currents shown in FIGURE 5 relate to the conditions which would prevail if the secondary output terminals 4 and 5 were short circuited. The reason that these currents are shown is that no shield is required where the algebraic sum of the short-circuit current is zero. When a nonzero impedance is connected between terminals 4 and 5, this impedance will be reflected into the primary circuit and the current magnitudes will no longer be as shown.

Figure 6:
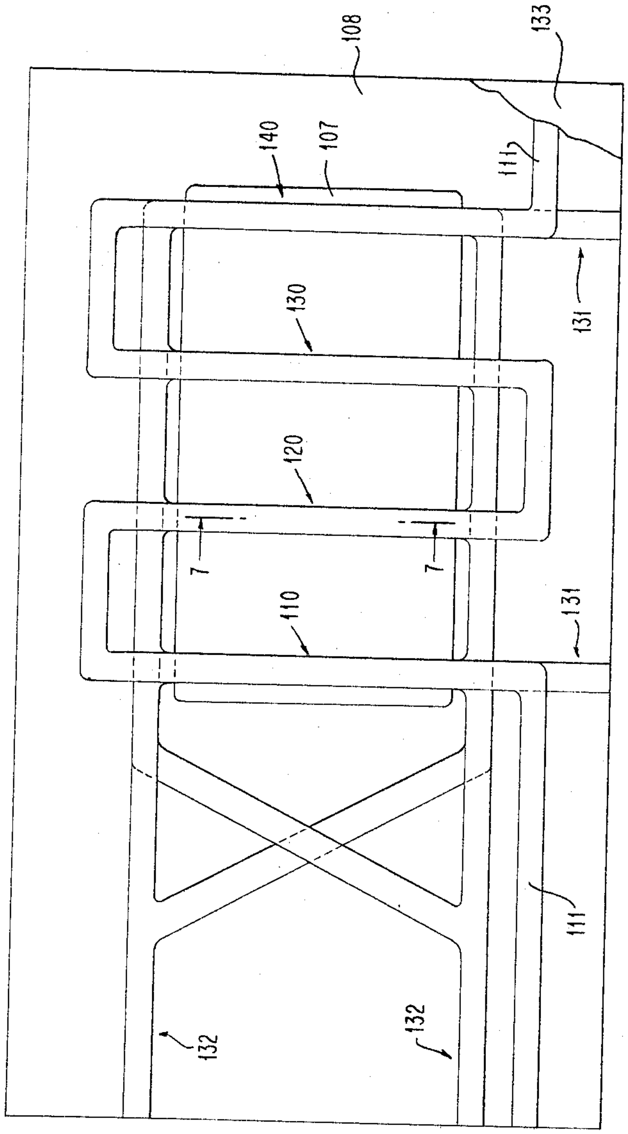
FIGURE 6 is a plan view of an alternate embodiment of the invention.
Figure 7:
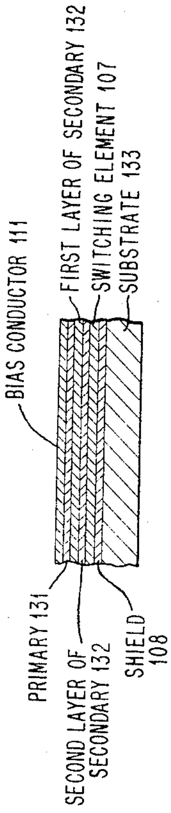
FIGURE 7 is a side view of the alternate embodiment taken along line 7—7 in FIGURE 6.

A second embodiment of the present invention for use with a metal substrate is shown in FIGURES 6 and 7. FIGURE 6 is a top view of the second embodiment, and FIGURE 7 is a side view taken along line 7—7 in FIGURE 6.

The composite transformer shown in FIGURES 6 and 7 includes four individual transformers, 110, 120, 130 and 140. Similar to the four individual transformers in the first embodiment of the invention, the four transformers 110, 120, 130 and 140 are formed by a primary 131 positioned above a secondary 132. The primary 131 and the secondary 132 are identical to the previously-described primary 31 and to the previously-described secondary 32. The primary 131 and the secondary 132 are positioned above a superconducting shield 108 which is deposited on a supporting substrate 133. Shield 108 covers the entire substrate 133 including the entire area beneath the transformer.

A conductor 111 hereinafter called a bias conductor is positioned above primary 131 and a switching element 107 is positioned between the secondary 132 and shield 108. The primary 131, the secondary 132, the conductor 111 and the shield 108 are made of a hard superconducting material such as lead and switching element 107 is made of a soft superconducting material such as indium. Substrate 133 is made of a metal such as aluminum which acts as a shield even though it is not superconducting.

As with the first embodiment of the invention, for clarity of illustration, no insulating material is shown between the various layers of circuitry. However, it will naturally be understood that each layer of circuitry must be insulated from the others. That is, there is insulation between bias conductor 111 and primary 131, insulation between primary 131 and the first layer of secondary 132, insulation between the first layer of sceondary 132 and the second layer of secondary 132 and insulation between the secondary 132 and the switching element 107 and between the secondary 132 and the shield 108. No insulating material is needed between switching element 107 and shield 108; however, the transformer will operate satisfactorily if switching element 107 is insulated from shield 108.

A steady bias current is applied to conductor 111. The magnitude of the bias current is sufficient to generate a magnetic field just below the magnitude of the magnetic field necessary to change any portion of switching element 107 from the superconducting state to the resistive state. Hence, when current is applied to primary conductor 131, that portion of switching element 107 which is located in the vicinity of transformers 110, 120, 130 and 140 is changed from the superconductive states to the resistive states.

The inductance of secondary 132 has one value when switching element 107 is superconductive and a different value when switching element 107 is resistive. In a conventional transformer such as that described in the first embodiment of the invention the electromotive force in the secondary of the transformer is generated due to change in the current in the primary of the transformer That is, $$E=M\frac{di}{dt}$$

In the transformer shown in FIGURES 6 and 7, there is an electromotive force generated in the secondary due to the changes in the current in the primary; however, since switching element 107 changes from the superconductive state to the resistive state when current is applied to primary conductor 131, there is another voltage generated in the secondary 132 due to the change in inductance. This electromotive force can be expressed as $$E=I\frac{dL}{dt}$$

Hence, in the transformer shown in FIGURES 6 and 7, the voltage generated in the secondary 132 has two components. The first component is due to the change in current in primary 131 and the second component is due to the fact that switching element 107 changes from a superconductive state to a resistive state or vice versa.

The electromotive force in secondary 132 which is due to the change in current in primary 131 only last during that time that the current in primary 131 is changing.

However, the voltage in secondary 132 due to the fact that switching element 107 is changing state lasts during the entire time that switching element 107 is changing state. Hence, a signal with a relatively fast raise time in primary 131 would produce a relatively long pulse in secondary 132. The amount of time required to change the state of switching element 107 is dependent upon the characteristics of the signal applied to the primary 131 and upon thickness of the switching element of 107. Hence, for a particular primary input signal by increasing the thickness of switching element 107, the length of output pulse can be increased by increasing the thickness of switching element 107.

In the transformer shown in the previously-referenced application, a hole is cut in superconducting shield at the point where the coupling between the two conductors is desired (actually the shield is deposited everywhere except where the hole is desired). This has several disadvantages, especially where a metal substrate is used. Since the metal substrate, even though it is not superconducting, acts as a shield, a hole must be cut in the substrate at the point where the coupling is desired, and it is difficult to deposit thin film conductors over a hole in a substrate even if the hole is filled with plastic. The transformer shown in FIGURES 6 and 7 eliminates the necessity for providing a hole in the substrate.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A composite transformer comprising,
a primary input,
a secondary output,
a plurality of individual transformers, each individual transformer having a primary conductor, and a secondary conductor juxtaposed to said primary conductor, said secondary conductors being divided into first and second groups,
first means connecting said first group of secondary conductors in parallel with said secondary output,
second means connecting said second group of secondary conductors in parallel, said second means being positioned above said first means,
connecting means connecting said second means in parallel with said secondary output so that current in adjacent secondary conductors flows in opposite directions,
third means connecting said primary conductors in series with said primary input, said means being positioned over said first and said second means, and
a superconductive shield beneath each conductor where the algebraic sum of the short circuit currents in the various layers of circuitry is not zero.

2. A composite transformer comprising
a primary input,
a secondary output,
a plurality of individual transformers, each individual transformer having a primary conductor and a secondary conductor, said secondary conductor being juxtaposed to said primary conductor, said secondary conductors being divided into first and second groups, said primary conductors being arranged in pairs, each pair including two adjacent primary conductors,
first means connecting one end of each secondary conductors in said first group,
second means connecting the other end of each secondary conductor in said first group,
third means connecting one end of each secondary conductor in said second group,
fourth means connecting the other end of each secondary conductor in said second group, said first and second means being respectively positioned above said third and fourth means,
connecting means for connecting said first, second, third and fourth means to said secondary output, so that current flows in opposite directions in adjacent secondary conductors,
fifth means connecting the first end of each pair of primary conductors, said means being positioned over said first and third means,
sixth means connecting the second end of adjacent primary conductors which are not in the same pair of conductors, whereby all said primary conductors are connected in series, and
a superconducting shield beneath said second and fourth means, said connecting means, and said sixth means.

3. A composite transformer comprising,
a primary input,
a secondary output,
a plurality of individual transformers, each individual transformer having a primary conductor, and a secondary conductor juxtaposed to said primary conductor, said secondary conductors being divided into first and second groups,
a switching element in the vicinity of each of said individual transformers,
said switching element being fabricated from a soft superconducting material which can be changed from a superconductive state to a resistive state by the application of a magnetic field each of said conductors being fabricated from a hard superconducting material,
a superconducting shield beneath the entire composite transformer,
first means connecting said first group of secondary conductors in parallel with said secondary output,
second means connecting said second group of secondary conductors in parallel, said second means being positioned above said first means,
connecting means connecting said second means in parallel with said secondary output so that current in adjacent secondary conductors flow in opposite directions, and
third means connecting said primary conductors in series with said primary input, said means being positioned over said first and said second means.

4. A composite transformer comprising
a primary input,
a secondary output,
a plurality of individual transformers, each individual transformer having a primary conductor and a secondary conductor, said secondary conductor being juxtaposed to said primary conductor, said secondary conductors being divided into first and second groups, said primary conductors being arranged in pairs, each pair including two adjacent primary conductors,
a switching element in the vicinity of each of said individual transformers,
said switching element being fabricated from a soft superconducting material which can be changed from a superconductive state to a resistive state by the application of a magnetic field, each of said conductors being fabricated from a hard superconducting material,
a superconducting shield beneath the entire composite transformer,
first means connecting one end of each secondary conductors in said first group,
second means connecting the other end of each secondary conductor in said first group,
third means connecting one end of each secondary conductor in said second group,
fourth means connecting the other end of each secondary conductor in said second group,
said first and second means being respectively positioned above said third and fourth means, connecting means for connecting said first, second, third and fourth means to said secondary output, so that current flows in opposite directions in adjacent secondary conductors, fifth means connecting the first end of each pair of primary conductors, said means being positioned over said first and third means, and sixth means connecting the second end of adjacent primary conductors which are not in the same pair of conductors, whereby all said primary conductors are connected in series.

5. A composite transformer comprising, a primary input, a secondary output, a plurality of individual transformers, each individual transformer having a primary conductor, and a secondary conductor juxtaposed to said primary conductor, said secondary conductors being divided into first and second groups, connecting means connecting said primary conductors in series with said primary input, and said secondary conductors in parallel with said secondary output, said individual transformers being arranged side by side so that current flows in opposite directions in adjacent transformers, and said connecting means being arranged in multiple layers so that in one half the area of said connecting means the algebraic sum of the short circuit currents at any point is zero, and a superconducting shield beneath said connecting means where the algebraic sum of the short circuit currents is not zero.

6. A composite transformer comprising, a primary input, a secondary output, a plurality of individual transformers, each individual transformer having a primary conductor, and a secondary conductor juxtaposed to said primary conductor, a superconducting shield beneath the entire composite transformer, a superconductive switching element in the vicinity of each of said individual transformers between said individual transformers and said shield, biasing means adjacent each of said individual transformers to bias said switching element just below its resistive state, and connecting means connecting said primary conductors in series with said primary input, and said secondary conductors in parallel with said secondary output, whereby a small pulse with a fast raise time in said primary generates a relatively large pulse of relatively long duration in said secondary.

References Cited by the Examiner

UNITED STATES PATENTS

| | | | |
|---|---|---|---|
| 2,915,721 | 12/1959 | Farrand et al. ---- | 336—200 X |
| 2,987,631 | 6/1961 | Park ------------- | 307—88.5 |
| 3,184,674 | 5/1965 | Garwin ------------- | 323—44 |
| 3,185,862 | 5/1965 | Beesley ----------- | 307—88.5 |
| 3,207,921 | 9/1965 | Ahrons ----------- | 307—88.5 |
| 3,214,679 | 10/1965 | Richards ------------ | 323—44 |

JOHN F. COUCH, *Primary Examiner.*

LLOYD McCOLLUM, *Examiner.*

J. M. THOMSON, W. E. RAY, *Assistant Examiners.*